(No Model.)　　　　　　　　　　　　　　　　　　　　　2 Sheets—Sheet 1.
H. COLE.
DEVICE FOR DETERMINING OPTICAL AXES AND CENTERS OF LENSES.
No. 563,745.　　　　　　　　　　　　　Patented July 14, 1896.

Witnesses:
H. B. Bradshaw
A. L. Phelps

Inventor.
Harrison Cole,
By Staley and Shepherd
Attorneys

UNITED STATES PATENT OFFICE.

HARRISON COLE, OF COLUMBUS, OHIO.

DEVICE FOR DETERMINING OPTICAL AXES AND CENTERS OF LENSES.

SPECIFICATION forming part of Letters Patent No. 563,745, dated July 14, 1896.

Application filed August 16, 1894. Serial No. 520,535. (No model.)

*To all whom it may concern:*

Be it known that I, HARRISON COLE, a citizen of the United States, residing at Columbus, in the county of Franklin and State of Ohio, have invented a certain new and useful Improvement in Devices for Determining the Optical Axes and Centers of Lenses, of which the following is a specification.

My invention relates to the improvement of devices for determining the optical axes and centers of lenses; and the objects of my invention are to provide an instrument of this class particularly adapted for the use of opticians and oculists wherein are provided improved means for graphically determining the optical centers of spherical or compound lenses, the optical axes of cylindrical, prismatic, or compound lenses, for determining the horizontal line upon which a lens should be cut and set, for determining the optical center and angle at which any of the above-named lenses have been set in their frames or mountings, and to accomplish other purposes which will be more fully pointed out hereinafter. These objects I accomplish in the manner illustrated in the accompanying drawings, in which—

Figure 1:
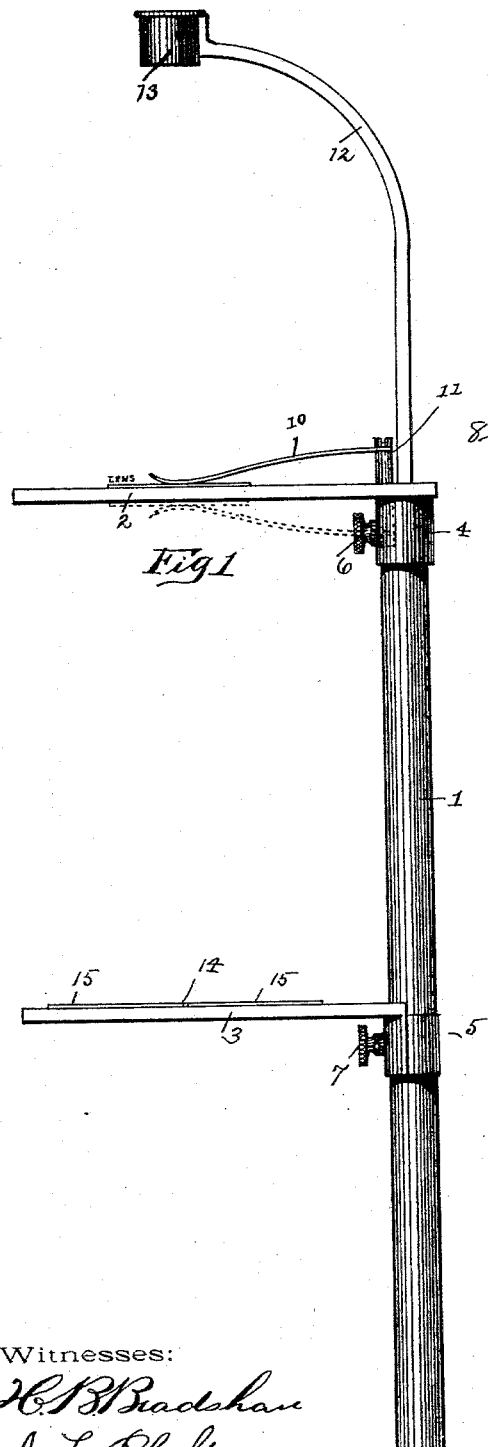
Figure 2:
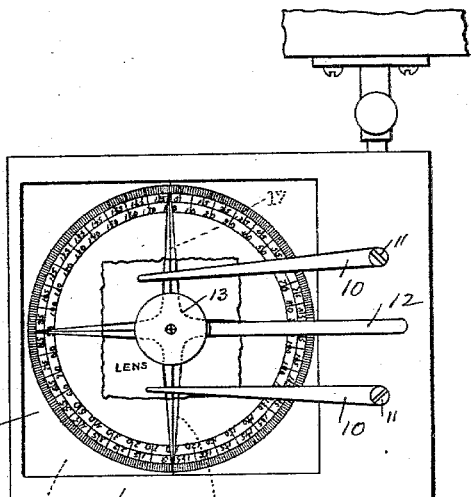
Figure 3:
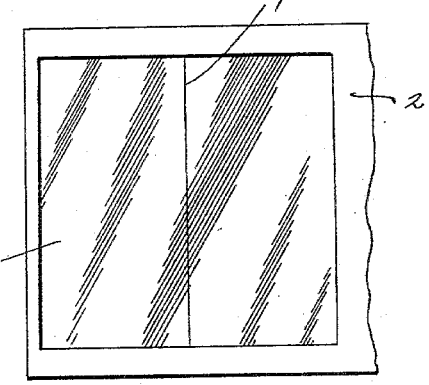
Figure 4:
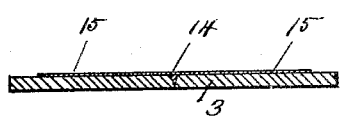
Figure 5:
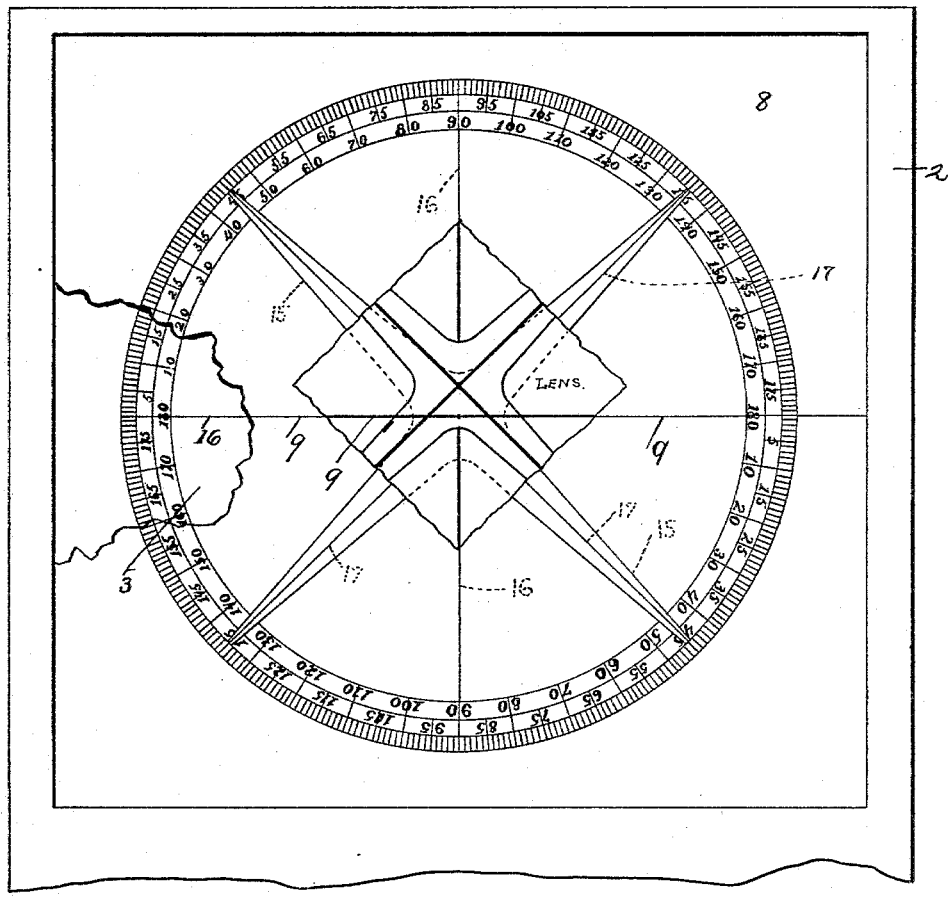

Figure 1 is a side elevation of my improved instrument. Fig. 2 is a plan view of the same. Fig. 3 is a plan view of the glass-staging and its frame. Fig. 4 is a central sectional view of the protractor-plate and the indicator which is pivoted thereon, and Fig. 5 is an enlarged plan view showing the glass-staging and the protractor as it appears through the same with a lens resting upon the staging.

Similar numerals refer to similar parts throughout the several views.

In carrying out my invention I employ a rod or standard 1, which may be suitably supported in a vertical position or at any desired inclination therefrom, said standard being adapted to adjustably support, as hereinafter described, an outwardly-extending stage-frame 2, and at a point below said stage-frame a protractor-plate 3. Both the stage-frame and protractor-plate are provided at their inner ends with short downwardly-extending sleeves, (indicated at 4 and 5, respectively,) said sleeves loosely surrounding the standard 1 and being adjustably retained in connection therewith by means of set-screws 6 and 7. The frame 2 is made to inclose, as shown, a glass plate or stage which is indicated at 8, said glass stage having cut or otherwise indicated thereon a central line 9, which extends between opposite sides of the stage.

10 indicate lens-holding spring-fingers, of which I preferably employ two, the inner ends of the same being connected with short posts 11, which are detachably secured to the inner portion of frame 2 and adapted to be made to rise therefrom or project below said frame. These fingers extend outwardly and are bent downwardly, the outer end portions thereof being adapted to exert a spring-pressure against a lens which is adapted to be supported upon or against the upper side of the stage 8. The protractor-plate 3, which is arranged vertically beneath the stage 2, is provided with a circular scale or protractor on which are indicated degree marks and numbers preferably from "0" to "180." This protractor-plate is also provided with two cross-lines 16, which intersect the protractor center at their crossing.

At the center of the protractor-circle I pivotally connect with the upper side of the plate 3 the central portion of a rotating indicator 14, which is preferably provided with four index-fingers 15, which are arranged, as shown, to divide the protractor-scale into four euqal parts or segments. As indicated at 17, the index-fingers are provided with central lines which extend throughout their lengths and which meet or cross each other over the pivotal center of the indicator.

From the inner portion and upper side of the stage-frame 2 I preferably cause to rise a bracket-rod 12, which has its upper portion bent outward and made to support a suitable tubular eyepiece or guide 13, so that its vertical axis may pass through the center of the stage 8.

In order to illustrate a few of the uses for which my improved device may be employed, we will assume that we are desirous of determining the optical center of a spherical lens. In this case the lens is placed upon the stage 8, where it may be movably detained by the pressure of the spring-fingers 10. With the eye over the eyepiece 13 the lens is moved until the cross-lines 17 of the index-fingers or lines 16 upon the protractor-plate appear continuous as seen through the lens and where they project beyond it. This result depends on the fact that when the projection of a line upon a lens passes through the optical center of the latter there is no lateral distortion of the line as seen through the lens. Hence the line as seen within and outside the lens appears continuous, and the junction of two such lines locates the optical center.

In order to mark a cylindrical or compound lens for cutting or setting where the required angle is given by prescription, the indicator is so turned that one of the lines 17 of its fingers point upon the protractor to the angle required. The lens is so then placed upon the stage 8 with its cylindrical surface facing as it is intended to be set and its axes approximately in line with the angle required. The lens is then moved until the lines 17 of the index-fingers appear continuous both within and without the edges of the lens. The point of crossing of the lines thus found indicates the optical center of the lens and the line 9 is coincident with the horizontal line at which the lens should be set. By placing a dot at the center thus found, and also dots at the margin of the lens immediately above the line 9, a guide is given for the placing of the lens on the usual cutting-pad.

To determine the prismatic displacement of a lens where a prism is prescribed, either alone or in combination with other refractive surfaces, one or more of the fingers 10 may have their inner ends secured to the under side of the frame 2 in the position shown in dotted lines in Fig. 1 of the drawings, and a plane prism of the required strength may thus be held in contact with the under side of the stage 8. This prism is to be placed with its axes as indicated by the prescription, but with its base reversed. This being done, the instrument is to be used as last above described, thus determinining the focal center and axes of triple combination in one operation.

By the use of my improved device I am also enabled to determine the optical center and angle of refraction of a lens after it is set in spectacle-frames or mountings. This I accomplish by placing the spectacle or eyeglass upon the stage 8, so that its horizontal line corresponds with the line 9. Then by moving the lens back and forth, but always maintaining the coincidence of its horizontal line with said line 9, and at the same time revolving the indicator until the crossed lines of its index-fingers appear continuous within and without the lens, then one of the lines 17 of the index-fingers will point to the angle indicated on the protractor at which the lens is set.

The construction and arrangement of the parts herein described and shown are such as to enable all the above operations, as well as others which may be accomplished by its use, being accomplished with extreme accuracy. Owing to the adjustable connection of both the stage and the protractor-plate with the standard 1, it will be seen that said parts may be readily moved toward or away from each other, thus accommodating the instrument to lenses of different strengths, as in the case of a strong convex lens which requires the protractor to be brought near to clearly define the image of the lines, while in a weak convex or concave lens the reverse is required.

It is evident that the instrument herein shown and described might be employed without the aid of the eyepiece 13, which simply assists in establishing a point for the position of the eye and aids in speed and accuracy in determinations. It is evident that my improved instrument may be employed for other purposes similar to those herein mentioned, such as decentering a lens.

It is obvious that an instrument of the character shown and described may be produced at a reasonable cost and in a simple form, and that the same will be of great utility not only to opticians but to oculists and others.

Having now fully described my invention, what I claim, and desire to secure by Letters Patent, is—

1. In a device for determining the optical axes and centers of lenses the combination with a transparent stage having a central line across its face, of a protractor arranged beneath said stage and crossed lines upon the face of the protractor-plate, substantially as and for the purpose specified.

2. In a device for determining the optical axes and centers of lenses the combination with a transparent stage having a central line thereon, of a protractor-plate and protractor thereon arranged below said stage, crossed lines on the face of said protractor-plate and a fingered indicator pivotally supported within the protractor, substantially as and for the purpose specified.

3. In a device for determining the optical axes and centers of lenses the combination with a transparent stage and a central line thereon, of a protractor-plate and protractor thereon arranged beneath said stage, crossed lines on said protractor-plate, a fingered indicator pivoted on said protractor-plate and lines extending centrally throughout said fingers, substantially as and for the purpose specified.

4. In a device for determining the optical axes and centers of lenses the combination with a standard, a transparent stage supported therefrom and adjustable thereon and a line across said stage, of a protractor-plate and protractor thereon adjustably supported on said standard beneath said stage, crossed lines on said protractor-plate, a fingered indicator pivotally supported on the protractor-plate and crossed lines as described on said indicator, substantially as and for the purpose specified.

HARRISON COLE.

In presence of—
C. C. SHEPHERD,
C. M. VOORHEES.